United States Patent [19]

Andrzejewski

[11] 4,271,634
[45] Jun. 9, 1981

[54] CHANNEL-SHAPED SEALING STRIPS

[75] Inventor: Heinz Andrzejewski, Viersen, Fed. Rep. of Germany

[73] Assignee: Draftex Development, Switzerland

[21] Appl. No.: 61,255

[22] Filed: Jul. 27, 1979

[30] Foreign Application Priority Data

Jul. 29, 1978 [GB] United Kingdom ............... 31642/78

[51] Int. Cl.³ .............................................. E06B 7/16
[52] U.S. Cl. ....................................... 49/491; 49/441; 24/259 FS; 52/716
[58] Field of Search ................. 49/490, 491, 440, 441; 24/73 FT, 259 FS; 22/716-718

[56] References Cited

U.S. PATENT DOCUMENTS

| 3,165,793 | 1/1965 | Lynch | 49/491 X |
| 4,188,424 | 2/1980 | Ohno et al. | 49/490 X |

FOREIGN PATENT DOCUMENTS

| 2809502 | 9/1979 | Fed. Rep. of Germany | 49/491 |
| 1417633 | 12/1972 | United Kingdom | 49/490 |

Primary Examiner—Kenneth Downey

[57] ABSTRACT

Metal carriers are disclosed for use in channel-shaped sealing, trimming and finishing strips, and channel-shaped window glass guides, such as for fitting to motor vehicle bodies. The carriers comprise a series of U-shaped side-by-side elements which are connected together. Each element is connected to the adjacent element on one side by a single connecting link running along the base of the channel, and is connected to the adjacent element on the other side by two connecting links which join the legs of the adjacent elements. In addition, the distal ends of those legs which are connected together by the connecting links have abutting extensions. In use, the carriers are covered with extruded plastics or rubber material. The abutting extensions prevent or limit stretching of the strip - by preventing movement towards each other of the distal ends of the legs.

4 Claims, 2 Drawing Figures

CHANNEL-SHAPED SEALING STRIPS

BACKGROUND OF THE INVENTION

The invention relates to metal cores or carriers for use in channel-shaped sealing, trimming and finishing strips and channel-shaped window glass guides, and to such strips and guides.

Metal cores or carriers for such channel-shaped structures are known in the form of a series of side-by-side U-shaped metal elements which are unconnected to each other and are embedded in plastics or rubber material. Such carriers give the structure good flexibility, but suffer from the disadvantage that they can become inadvertently stretched—e.g. when being fitted into position around motor vehicle body door or window openings (a major application) or during the manufacturing process. Such stretched strips will normally resile, but this may take place over a period of time after the structure has been fitted to the vehicle body—and this shrinkage may well cause the structure to part from the body, producing an unsightly appearance and unsatisfactory operation.

An object of the invention is to provide an improved metal carrier for such structures.

BRIEF SUMMARY OF THE INVENTION

According to the invention, there is provided a metal carrier for a channel-shaped sealing, trimming or finishing strip or for a channel-shaped window glass guide, comprising a series of generally U-shaped metal elements arranged side-by-side in spaced relationship so as to define a channel, all adjacent elements being connected together by short connecting links, the elements of some of the adjacent pairs of elements being connected together only by links of a first type each of which extends between the bases of those elements, and the elements of the remaining pairs of adjacent elements being connected together only by links of a second type each of which extends from one leg of one of the elements to the corresponding leg of the adjacent element, each leg which is connected to another leg by a link of the second type also having limiting means for preventing or limiting the extent to which its distal end can move towards the distal end of the said other leg.

DESCRIPTION OF THE DRAWINGS

Metal cores or carriers embodying the invention, and channel-shaped sealing, trimming and finishing strips incorporating such carriers and embodying the invention, will now be described by way of example only, with reference to the accompanying drawings in which.

DESCRIPTION OF PREFERRED EMBODIMENTS

Figure 1:
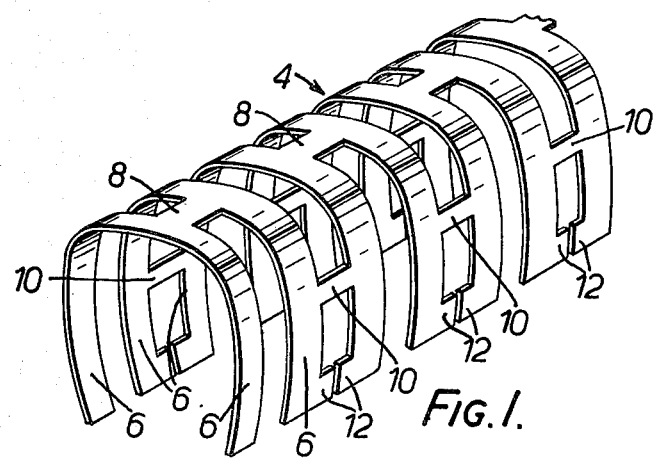
FIG. 1 is a perspective diagrammatic view of one of the metal carriers.

As shown in FIG. 1, the metal carrier 4 comprises a series of generally U-shaped metal elements 6 which are arranged side-by-side and spaced apart to define a channel. Each element 6 is connected to the adjacent element 6 on one side by only a single connecting link 8, the connecting link 8 connecting the bases of the respective elements 6 together. Each element 6 is connected to the adjacent element 6 on its other side by two connecting links 10, each connecting link 10 connecting an intermediate point on one of the legs of that element to an intermediate point on the corresponding leg of the adjacent element on that side.

In addition, the distal end of each leg which is connected to an adjacent leg by one of the connecting links 10 carries an extension 12 which terminates immediately adjacent to a corresponding extension 12 on the corresponding leg, and may in fact abut it.

The carrier is preferably made of metal and the connecting links 8 and 10, and the extensions 12, are preferably integral with the elements 6.

Figure 2:
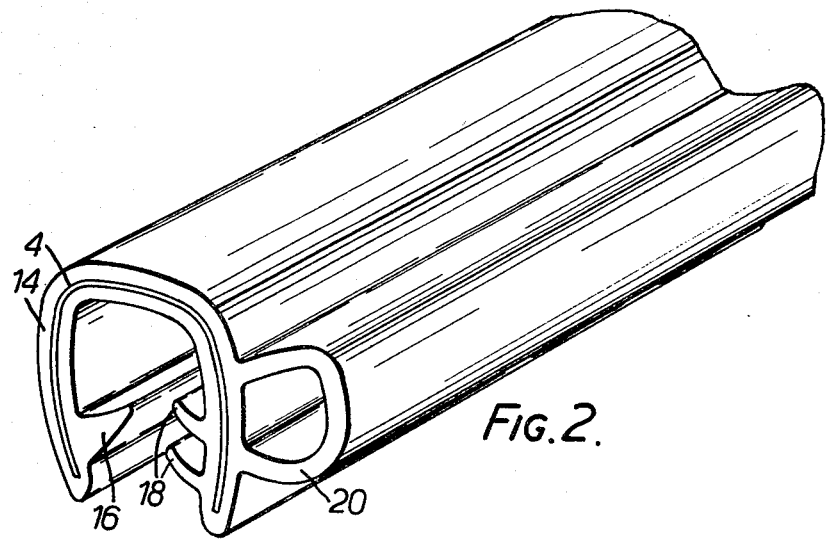
FIG. 2 is a perspective view of one of the channel-shaped strips.

As shown in FIG. 2, the metal carrier 4 is embedded in flexible covering material 14, which may be plastics or rubber material. The material 14 may be extruded material, and it may be provided with gripping ribs 16, 18, running longitudinally along the inside walls of the channel. There may be the same or different numbers of gripping ribs on each wall or, possibly, a gripping rib or ribs on only one of the walls. In use, the gripping ribs help to retain the sealing strip in position on a mounting flange or the like.

A seal 20 may be attached to run along the outside of the channel. The seal can be positioned to run along a side wall or the base of the channel. It may be integral with the material 14 or may be secured to it by some suitable means; in either case, it need not be of the same hardness as the material 14.

The construction of the carrier 4 is advantageous in that it resists stretching. More specifically, the extensions 12 resist stretching of the carrier 4 by preventing or limiting the extent of possible movement towards each other of the distal ends of the legs of alternate pairs of the elements 6. When a longitudinal pull is applied to the carrier, the legs which are connected together by the links 10 tend to pivot on these links so as to tend to move the distal ends of both legs together, and by resisting this movement of the distal ends of those legs, the extensions 12 prevent or limit the stretching of the carrier and thus of the complete strip. If the facing ends of each pair of extensions 12 are actually in contact with each other, then substantially no stretching of the carrier or strip will take place. If a gap is provided between the facing ends of each extension, then a controlled amount of stretching is possible, and this may be advantageous in certain cases.

Instead of the extensions 12, any other suitable means of preventing or limiting movement towards each other of the distal ends of the relevant legs may be provided.

The ability of the strip to resist stretching is of substantial practical advantage. In use, the strip may be supplied in lengths to vehicle body manufacturers for fitting to edge flanges and the like around openings, such as door openings, in the vehicle body. The action of fitting the strip onto the flange may involve rough treatment and the application of pull or tension to the strip by the fitter in order to make it fit snugly in a corner or bend for example. If the strip were able to stretch, as a result of this treatment, it would not immediately resile but would only do so over a period of time. When it did resile, therefore, the length of strip, which, previously, was just sufficient to encompass the opening, would become insufficient and would thus leave an unsightly gap. This possibility is avoided with the strip disclosed in this Specification.

There may also be a tendency for a strip to stretch due to temperature changes, and this also is resisted by the strip disclosed.

Although the disclosed strip resists stretching, it is capable of a limited amount of compressibility, and this characteristic is advantageous in that it provides an ability to take up small tolerances and enables snug fitting of the strip in bends and corners.

The carrier described may be manufactured in any suitable way. For example, it may be manufactured by cutting slots in a metal blank by means of a stamping or pressing operation. Instead, it could be manufactured by providing slits (instead of slots) in a metal blank, and then rolling the blank along a longitudinally extending region of the blank; this has the effect of compressing the blank along this region, only, so as to convert the slits into slots as shown in FIG. 1.

In either case, the blank, after the manufacturing process described above, could then be fed into an extruder of the cross-head type so as to cover it with extruded plastics or rubber material, and a structure so produced could then be bent into U or channel form before being fed to the extruder.

What is claimed is:

1. A channel-shaped sealing, trimming or finishing strip, or a channel-shaped window glass guide, comprising a series of generally U-shaped metal elements arranged in side-by-side and spaced-apart relationship so as to define a channel, each element being connected to the adjacent element on one side of it by a single first link, only, which extends from the base of that element to the base of the adjacent element and being connected to the adjacent element on its other side by two second links, only, each second link extending from a point on a respective one of the legs of that element to a point on the corresponding leg of the adjacent element on the said other side, each one of the pair of legs which are connected together by a said second link also carrying an extension piece which is adjacent to its distal end and which terminates in an abutment face adjacent the abutment face of the corresponding extension on the other one of those legs whereby the abutment of the abutment faces when the strip or guide is stretched limits the extent to which the distal ends of those legs can move towards each other and thus limits the extent of stretching of the strip or guide, and channel-shaped flexible covering material in which the elements, links and extension pieces are embedded.

2. A strip or guide according to claim 1, in which the covering material is extruded material.

3. A strip or guide according to claim 2, in which the extruded material defines at least one gripping rib running along at least one inside wall of the channel.

4. A strip or guide according to claim 1, in which the elements, the links and the extensions are all integral and are of the same thickness.

* * * * *